O. MACKENSEN.
SIGHTING DEVICE.
APPLICATION FILED JULY 23, 1914.

1,160,184.

Patented Nov. 16, 1915.
2 SHEETS—SHEET 1.

Witnesses:
Paul Krieger
Fritz Lander

Inventor:
Otto Mackensen

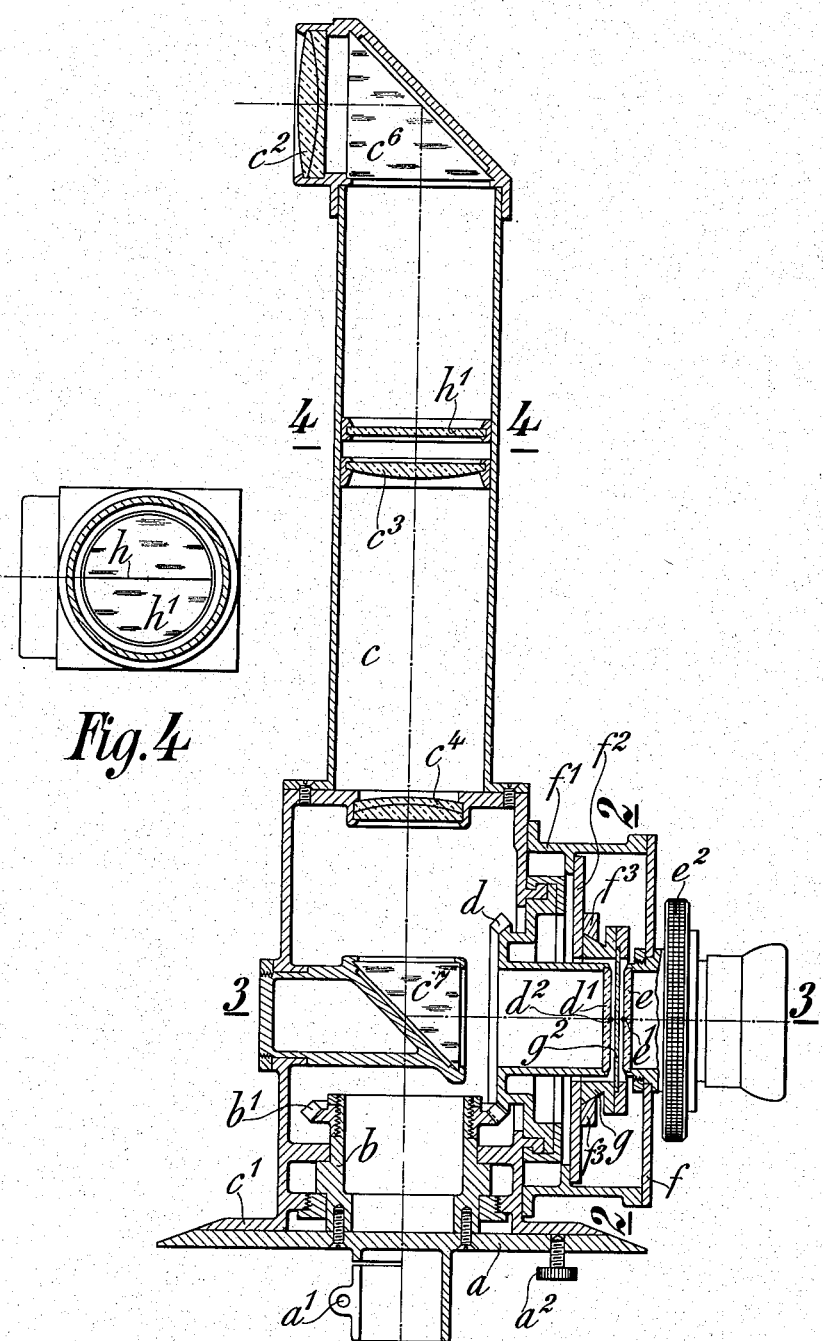

UNITED STATES PATENT OFFICE.

OTTO MACKENSEN, OF JENA, GERMANY, ASSIGNOR TO THE FIRM OF CARL ZEISS, OF JENA, GERMANY.

SIGHTING DEVICE.

1,160,184. Specification of Letters Patent. Patented Nov. 16, 1915.

Application filed July 23, 1914. Serial No. 852,773.

*To all whom it may concern:*

Be it known that I, OTTO MACKENSEN, a citizen of the German Empire, residing at Jena, Germany, have invented a new and useful Sighting Device, of which the following is a specification.

The present invention relates to devices, which serve for training torpedo ejectors on moving objects for ascertaining an angle of a triangle, of which one other angle and the sides containing the third angle are known.

According to the invention the rulers serving for representing the sides of the triangle are made transparent and are observed by means of one and the same magnifying glass. In consequence of their transparency they can be observed by transmitted light and can be moved over one another as desired, without the observation of their scales being obstructed. The transparent rulers may take the form of, for instance, glass plates or in a special case, when they are not graduated, be represented by threads. As the illumination of the rulers may be effected from that side of the device, which is remote from the magnifying glass, the dimensions of the whole device may be comparatively small.

It is particularly advantageous to dispose the rulers in such a manner that the ocular of a sighting telescope may serve as the magnifying glass and that the rulers are visible simultaneously with the image formed by the objective. If the sighting telescope be a terrestrial one, it will be found convenient to place the rulers in its rear image-plane, in order to make the setting easier for the observer, but both image-planes of the telescope or its front image-plane alone may equally well serve for the reception of the rulers. As three rulers lying one above the other cannot be disposed in one plane, the adjacent planes must also serve for this purpose. In order that with such an arrangement the observer may see the scales distinctly, their distance from the image-plane must be kept as small as possible, which may, for instance, be realized, if the middle ruler be made of a film-band. It is an advantage if the graduations as well, as far as they are necessary, be observed through the magnifying glass. When the ocular of a sighting telescope is used as the magnifying glass, the training process may be made particularly simple, if one of the rulers be coupled with the sighting telescope in such a manner that, on the latter rotating, the ruler will rotate through the same angle.

Figure 1:
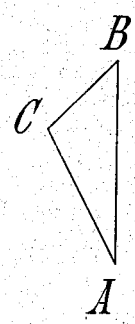

In order to illustrate the method followed, when training torpedo ejectors on moving objects, there is shown in Figure 1 a triangle A B C, in which point A corresponds to the position of the ejector, point B to the position of the moving object at the commencement of the training and point C to the position of the object, when hit by the torpedo. The two sides A C and B C correspond to the path of the torpedo and to that of the object aimed at respectively, the paths covered in the unit of time (the speeds) and the angle A B C are to be assumed as known, while the subject of the invention serves for ascertaining the angle B A C.

Figure 2:
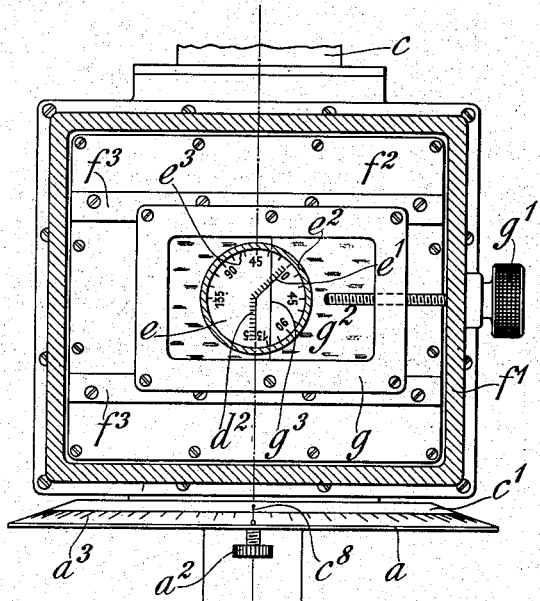
Figure 3:
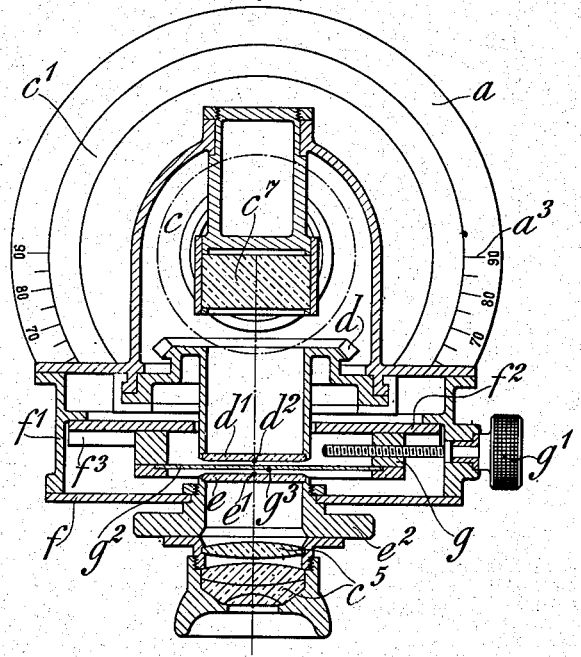

Figs. 2 to 5 show a constructional example of the invention, in which the rulers serving for the representation of the sides of the triangle are disposed in the ocular focal plane of a sighting telescope, one of the said rulers being coupled with the sighting telescope in such a manner that, on the latter rotating, the ruler will rotate through the same angle. Fig. 2 is a vertical section through the casing serving for the reception of the rulers, Fig. 3 a cross-section taken through the said casing and the sighting telescope and containing the axis of the ocular, Fig. 4 a cross-section through the sighting telescope seen from below, and Fig. 5 a vertical section through the sighting telescope containing the axis of rotation of the device.

To the bedplate $a$ of the device, which is adapted to be mounted on a pivot belonging to the torpedo ejector and to be fixed on the same by means of a clamping device $a^1$, a bearing body $b$ is screwed. On this latter a sighting telescope $c$ is rotatably journaled, which can be fixed relatively to the bedplate by its foot $c^1$ by means of a clamping screw $a^2$. The sighting telescope is a terrestrial one, its objective is marked $c^2$, its collective lens $c^3$, its lens of reversion $c^4$ and its ocular $c^5$. The rays coming from the objective are deflected by each of two reflecting prisms $c^6$ and $c^7$ through 90°. To the bearing body $b$ there is screwed a bevel gear wheel $b^1$, with which engages a bevel wheel $d$ having the same number of teeth, which latter wheel is rotatably journaled on the casing of the sighting telescope $c$. The wheel $d$ carries a glass plate $d^1$, the rear surface of which lies directly in front of the ocular focal plane and is provided with a scale graduated in units of speed, the zero-point of which scale lies in the ocular axis. Immediately behind the ocular focal plane lies the front surface of a second glass plate $e$, which is provided with a speed-scale $e^1$ having graduations to the same scale as those of the scale $d^2$. The zero-point of the scale $e^1$ also lies in the ocular axis. To the carrier $e^2$ of the glass plate $e$, which carrier is provided with a milled edge and is rotatably journaled in the cover $f$ of a casing $f^1$ fixed to the sighting telescope, the mounting of the ocular $c^5$ is screwed. On a plate $f^2$ fitted in the casing $f^1$ a slide $g$ is horizontally guided between two guides $f^3$ and is displaceable by means of a milled head $g^1$. The slide carries a film $g^2$, which lies in the ocular focal plane between the two glass plates $d^1$ and $e$ and is provided with a vertical stroke $g^3$. In order that the scale $e^1$ may be set to correspond to the value of the angle A B C (see Fig. 1), the glass plate $e$ is provided with graduations $e^3$, which extend 135° each way from the point of inter-section of the production of the scale $e^1$ beyond its end point with the circular scale. The index for this scale is formed by a sighting mark $h$, which is traced on a glass plate $h^1$ fitted immovably in the objective focal plane in such a manner that a radial and vertical image is formed of it in the ocular focal plane by the collective lens $c^3$ and the lens of reversion $c^4$. A second graduation $a^3$, which serves for indicating the angle B A C to be ascertained (see Fig. 1), is marked on the bed-plate $a$. It extends each way through a quarter of a circle, reckoning from a point on the circular scale, and its index $c^8$ is disposed on that side of the foot $c^1$ of the sighting telescope, which faces the ocular $c^5$. When the scale $d^2$ is directed vertically downward and the scale $e^1$ vertically upward, the angular value zero is indicated on the corresponding degree scales $a^3$ and $e^3$. In the drawing the position of the three rulers is such that the plate $d^1$ is in its zero-position, the plate $e$ is rotated through 45° out of its zero-position in the clockwise direction and the film $g^2$ is displaced toward the right out of the middle of the image-field.

When it is to be used, the device must be placed on the pivot provided on the torpedo ejector, which pivot corresponds to the point A in Fig 1, and must be fixed on this pivot by the clamping device in such a manner that that diameter of the bedplate $a$, which contains the zero-stroke of the degree-scale $a^3$, coincides with the longitudinal axis of the ejector, the said zero-stroke being turned in the opposite direction to the muzzle of the ejector. The sighting telescope $c$ having then, by being rotated about its longitudinal axis, been set in such a manner that the pointer $c^8$ on its foot $c^1$ indicates the value zero on the degree-scale $a^3$ and having been fixed in this position on the bed-plate by means of the clamping screw $a^2$, it is pointed by rotating the ejector or the carrier of the same (e. g., when the ejector is fixed to the hull of the ship, by altering the course of the ship) in a horizontal plane toward the moving object to be aimed at, so that the said object is presented to the observer as coinciding with the sighting mark $h$. The position of the moving object at this period corresponds in Fig. 1 to the point B. Thereupon by turning the milled edge of $e^2$ the glass plate $e$ is to be rotated out of its zero-position, in which its scale $e^1$ is directed vertically upward and in which the value zero is indicated on its degree-scale $e^3$ by the sighting-mark $h$, through the angle contained between the direction of travel B C of the object aimed at and the sighting direction A B. Let this angle A B C have been ascertained in any suitable manner, e. g. by being estimated. According as the object aimed at moves out of the middle of the image-field through the left-hand or the right-hand half of the same, the glass plate $e$ is to be rotated from out of its zero-position in the clockwise or the counter-clockwise direction, so that either one half or the other of the degree-scale $e^3$ serves for indicating the angle. Corresponding to the chosen direction of motion from B to C in Fig. 1 the glass plate is to be rotated in the clockwise direction through the angle A B C, during which rotation the scale $e^1$ travels from the vertical position into one corresponding to that of the side B C. Thereupon the film $g^2$ is to be displaced by means of the milled head $g^1$ until its vertical stroke $g^3$ cuts off on the scale $e^1$ a valve corresponding to the speed of the object aimed at, which may again have been arrived at in any suitable manner, e. g. by being estimated. Thereupon the clamping screw $a^2$ is to be released and the sighting telescope $c$ to be rotated relatively to the bedplate $a$, such rotation being according to the direction of travel of the object (movement from the middle of the image-field to the left or the right) in the clockwise or the counter-clockwise direction, hence, in Fig. 1, corresponding to the direction of travel from B to C in the clockwise direction. In consequence of the bevel wheel $d$ being rotated by the bevel wheel $b^1$ the glass plate $d^1$ along with the scale $d^2$ also experiences a rotation, the angular value of which is equal to, but the sense of which is opposite to that of the rotation of the sighting telescope. The rotation of the sighting telescope is continued, until by the vertical stroke $g^3$ a value is cut off on the scale $d^2$, which corresponds to the speed of the torpedo, the scale $d^2$ moving from the vertical position into one corresponding to that of the side A C and thus inclosing with the sighting mark $h$ the required angle B A C, the value of which can be read off on the degree-scale $a^3$. The triangle thus formed by the three rulers is similar to the triangle A B C of Fig. 1, the point of intersection of the scales $d^2$ and $e^1$ corresponding to the point C, the point of intersection of $d^2$ with the vertical stroke $g^3$ to the point A and the point of intersection of $e^1$ and $g^3$ to the point B. It is then only necessary to again tighten the clamping screw $a^2$ and to rotate the sighting telescope by rotating the torpedo ejector or its carrier in a horizontal plane, until the object aimed at is seen as coinciding with the sighting mark $h$. At this moment the torpedo should be released.

I claim:

1. In a sighting device for torpedo ejectors three superposed transparent rulers, which are displaceable relatively to one another and are adapted to form a triangle, means for displacing the rulers relatively to one another according to the speed of the torpedo and to the relative movement of the torpedo ejector and the target, and a magnifying glass adapted for observing all three rulers.

2. In a sighting device for torpedo ejectors three superposed transparent rulers, which are displaceable relatively to one another and are adapted to form a triangle, means for displacing the rulers relatively to one another according to the speed of the torpedo and to the relative movement of the torpedo ejector and the target, and a sighting telescope, the ocular of which is adapted for simultaneously observing the three rulers and the image presented by the objective of the telescope.

3. In a sighting device for torpedo ejectors a sighting telescope comprising a lower part adapted to be fixed on a support and an upper part fitted to the lower part rotatably on a vertical axis, which upper part comprises an objective, an ocular and three superposed transparent rulers, which rulers are displaceable relatively to one another and are adapted to form a triangle, means for displacing the rulers relatively to one another according to the speed of the torpedo and to the relative movement of the torpedo ejector and the target, which means comprise coupling means between one of the rulers and the lower part of the telescope, so as this ruler to be rotated in the plane of said triangle by a rotation of the upper part of the telescope through the same angle, the said ocular being adapted for simultaneously observing the three rulers and the image presented by the said objective.

OTTO MACKENSEN.

Witnesses:
PAUL KRUGER,
FRITZ SANDER.